SIDETONE CORRECTION WINDING IN TELEPHONE RECEIVER
Filed Sept. 27, 1948
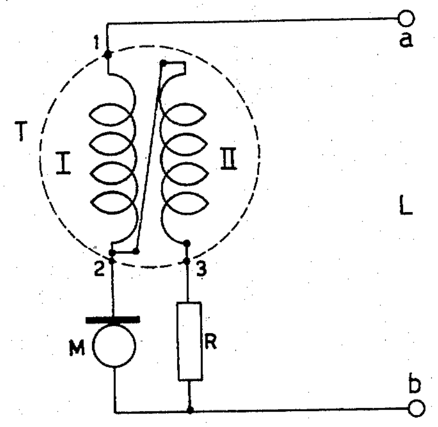
INVENTOR
GIORGIO DAL MONTE
BY: Young, Emery & Thompson ATTYS.

Patented Dec. 26, 1950

2,535,903

UNITED STATES PATENT OFFICE 2,535,903

SIDETONE CORRECTION WINDING IN TELEPHONE RECEIVER

Giorgio Dal Monte, Milan, Italy, assignor to Officine Lombarde Apparecchi di Precisione O. L. A. P. della Siemens Societa per Azioni, Milano, Italy, a corporation of Italy Application September 27, 1948, Serial No. 51,403
In Italy October 2, 1947

2 Claims. (Cl. 179—81)

In the circuits used up to now with common battery and automatic common battery telephone sets, side-tone correction is attained in a known manner by means of an induction coil which provides for annulling the influence of the variable currents generated in the microphone and acting upon the receiver of the same set.

It is the object of the present invention to attain the same result without having recourse to a purposing induction coil.

To this end, the constitution of the receiver has been modified in such a manner as to enable it to provide by itself for correcting the sidetone.

Present day receivers comprise, as is known, a permanent magnet and a winding which if run through by voice currents varies the flux caused by said magnet, and thus translates the current variations into mechanical vibrations of a lamina interposed in the magnetic circuit.

In the telephone set according to the present invention, on the magnetic circuit of the receiver there are arranged two distinct windings which are connected in such a manner that the magnetic effects produced by them are concordant for voice currents coming from the line and discordant for those generated by the microphone; therefore, the receiver is made insensitive in itself to voice currents generated by the microphone.

The accompanying drawing shows a simplified diagram of a telephone set according to the invention.

References *a*, *b* designate the two wires of the line L, T is the receiver with the two windings I and II, M is the microphone and R is a resistor.

For the sake of simplicity, the windings I and II of the receiver T are at first supposed to be perfectly equal to each other. The voice currents coming from the line L flow at a certain moment through the following circuit: wire *a*, winding I of receiver T (points 1—2), microphone M and, in parallel, winding II of receiver T (points 2—3), resistor R, wire *b*. The share of variable current flowing in the winding II of the receiver has an effect concordant with the effect of the current flowing in the winding I; therefore, the fluxes generated by the two windings sum up and the receiver translates the currents coming from the line into sounds. On the contrary, under local speech, the microphone M is to be considered as the source of voice currents; in this case, the variable current flows at a certain moment through the following circuit: microphone M, winding I of receiver T (points 2—1); wires *a*, *b* and, in parallel, winding II of receiver T (points 2—3), resistor R, microphone M.

If the windings I and II of T are supposed to be equal to each other and resistance R is supposed to correspond to the line impedence, the variable currents flowing through said windings are equal to each other in value and discordant from each other in effect; therefore, the fluxes generated by them annul each other at every instant. The lamina of the receiver T is in this case subjected only to the constant flux of the permanent magnet and no sound is heard for the variable currents generated in the microphone. It is obvious that the two windings I and II need not be equal to each other; in fact, for operation suffices to attain the equality of the fluxes generated by them in the case of voice currents coming from the microphone M. To this purpose, to the ratio between the number of turns of the two windings there is to correspond such a ratio between the values of line impedance and resistance R, as to make the ampère-turns in the two windings equal to each other.

All present constructive forms of telephone receivers are apt to embody the new receiver; it is necessary only to add to them a second winding (II) and a third external electric connection.

What I claim as my invention and desire to secure by United States Letters Patent is:

1. In a telephone set comprising a microphone and a receiver, two magnetically coupled field windings included in said receiver, one of said windings being series connected with said microphone across the line and the other of said windings being parallel connected across said microphone and having one terminal connected to the lead connecting said first mentioned winding to said microphone, the sense of winding of said windings being such that the magnetic effects produced by them are concordant for voice currents coming from the line.

2. In a telephone set comprising a microphone, a receiver and an auxiliary resistor, two magnetically coupled field windings included in said receiver, one of said windings being series connected with said microphone across the line and the other of said windings forming with said resistor a series combination which is parallel connected across said microphone and having one terminal connected to the lead connecting said first mentioned winding to said microphone, the resistance value of said resistor being equal to the line impedance multiplied by the ratio between the number of turns of said two windings.

GIORGIO DAL MONTE.

REFERENCES CITED

The following references are of record in the file of this patent:

UNITED STATES PATENTS

| Number | Name | Date |
|---|---|---|
| 235,658 | Strong | Dec. 21, 1880 |
| 322,727 | Jackson | July 21, 1885 |
| 530,516 | Field | Dec. 11, 1894 |
| 551,347 | Brown | Dec. 10, 1895 |
| 751,829 | Billig | Feb. 9, 1904 |
| 1,254,473 | Campbell | Jan. 22, 1918 |
| 2,417,067 | Farralla | Mar. 11, 1947 |